W. L. HOGG.
TELEGONIOMETER.
APPLICATION FILED MAR. 20, 1920.
1,399,963.
Patented Dec. 13, 1921.
3 SHEETS—SHEET 3.
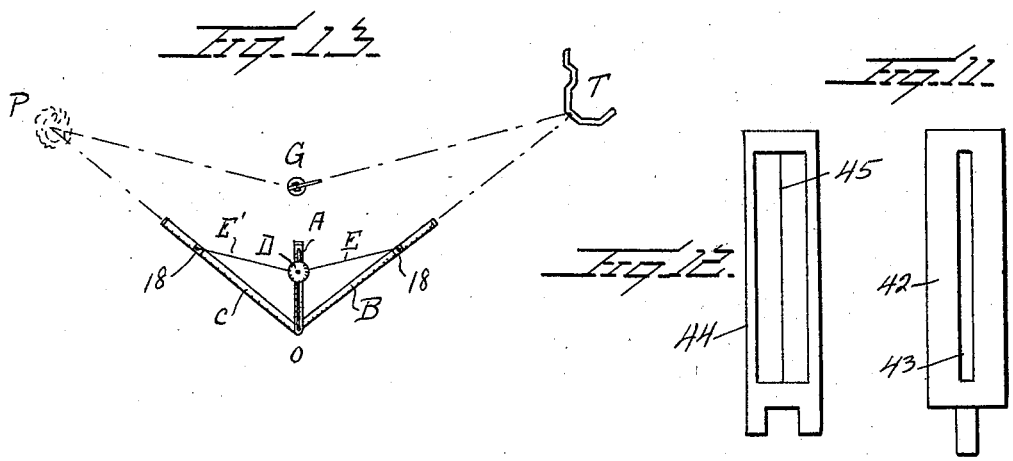
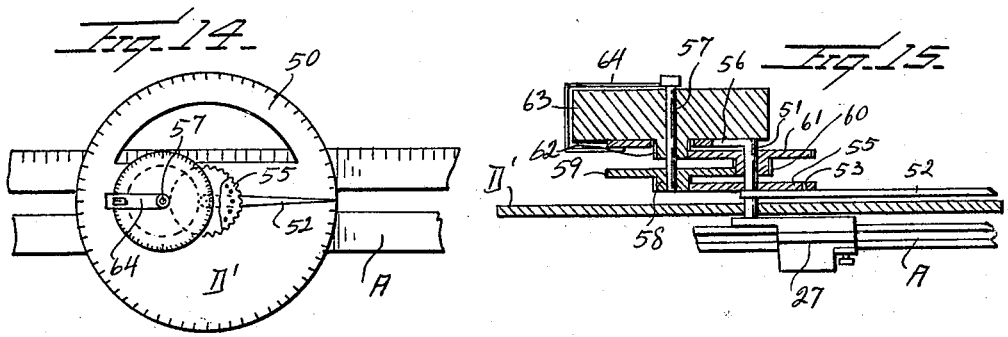
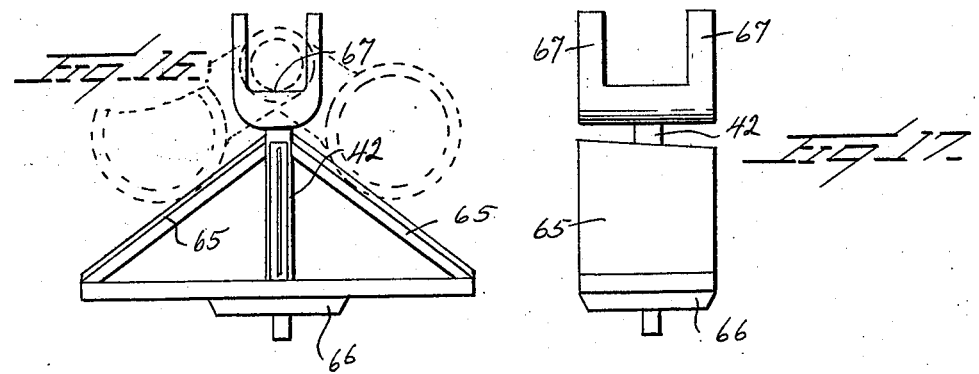
Inventor
W. L. Hogg
By Watson E. Coleman
Attorney

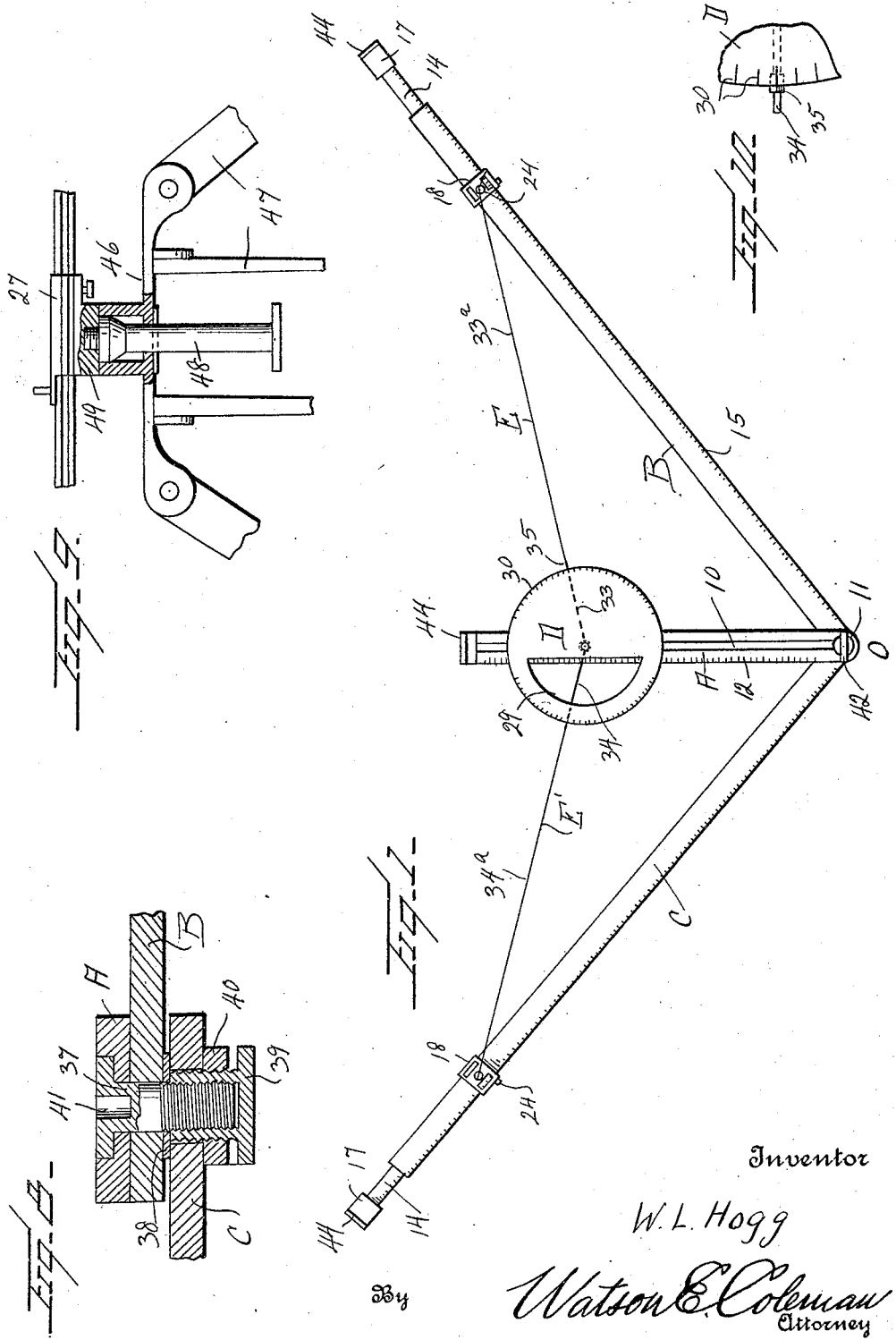

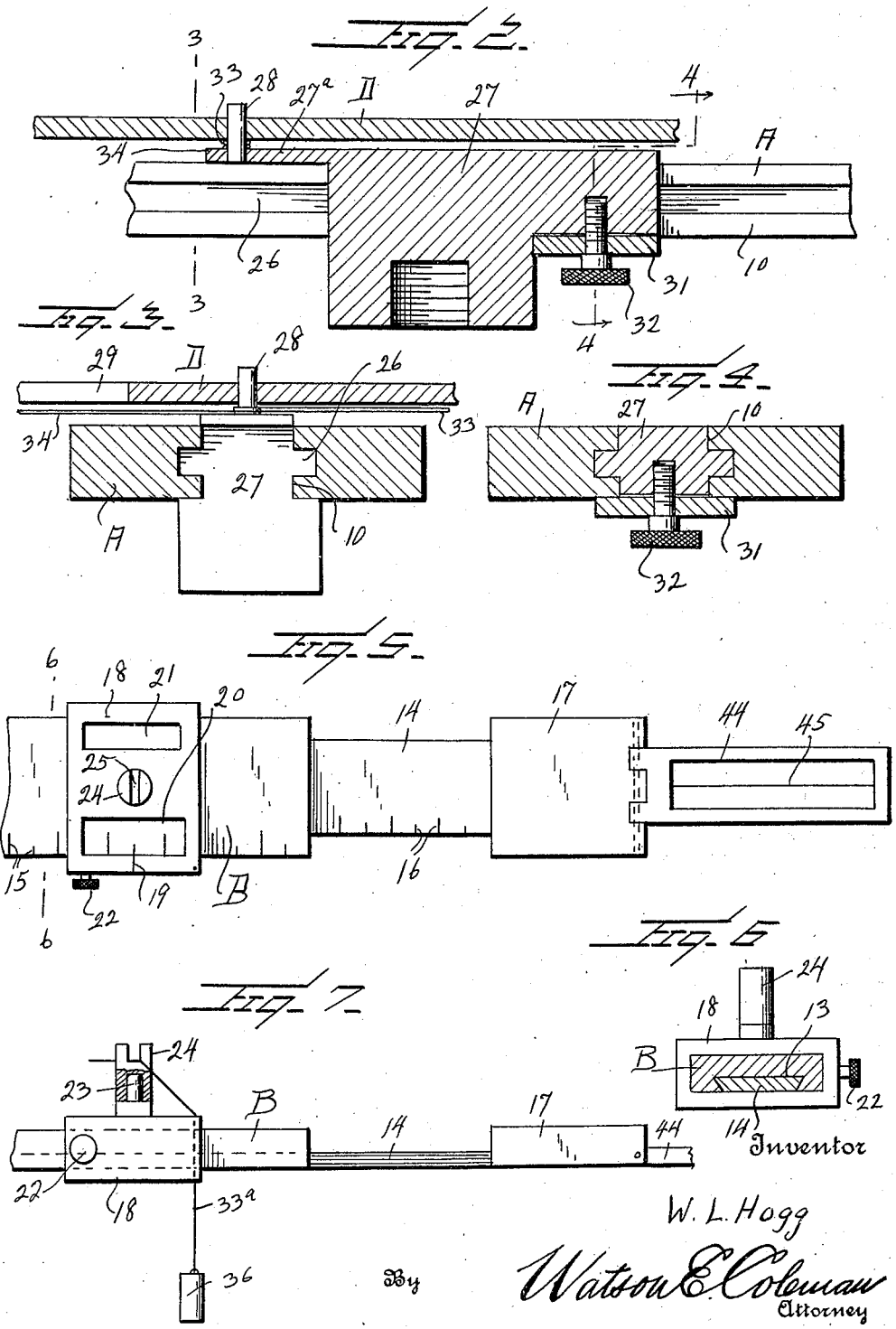

UNITED STATES PATENT OFFICE.

WILLIAM L. HOGG, OF DENVER, COLORADO.

TELEGONIOMETER.

1,399,963. Specification of Letters Patent. Patented Dec. 13, 1921.

Application filed March 20, 1920. Serial No. 367,351.

*To all whom it may concern:*

Be it known that I, WILLIAM L. HOGG, a citizen of the United States, residing at Denver, in the county of Denver and State of Colorado, have invented certain new and useful Improvements in Telegoniometers, of which the following is a specification, reference being had to the accompanying drawings.

This invention relates to devices for measuring angles, and particularly to what I term a telegoniometer, that is a device for the measurement of distant angles and distances, certain angles and distances being known.

One of the objects of this invention is to provide an instrument for computing the angle of deflection in artillery firing.

In modern warfare, over 90% of the artillery firing is indirect, that is the gunner does not see the target, but he is given the direction of fire by an observer stationed at a distant point. Two things are necessary, therefore, for a proper handling of the guns, an aiming point to be seen from the guns with relation to which the angle of the guns is calculated, and an observation point from which the target, the aiming point, and, if possible, the guns can be seen, though this latter is not necessary, the officer at the observation point, by mathematical calculations, directing the fire of the guns, that is calculating the angle which the guns are to make with the aiming point in order to find their target.

At the present time, the battery commander takes his station at the observation point, and measures the angle "A," as it is known, that is the angular relation of the sighting lines running from the observation post to the enemy and from the observation post to the aiming point. This angle, however, is manifestly not the angle from the aiming point required by the guns. The officer, therefore, imagines a line extending from the observation point parallel to a line running from the guns to the target and imagines another line from the guns to the aiming point. He then adds to or subtracts from the angle "A," as it is known, the sum of or difference between the angles made by his imaginary lines, and after additional calculations, which is unnecessary to state here, secures the proper angle to be given to the guns with reference to the aiming point. The mathematical calculations involved require quite a bit of mental computation and are always liable to error. It is to avoid this necessity of calculation and to permit of the rapid training of the guns that I have devised the mechanism herein illustrated and described, though it is to be understood that the mechanism might be used for other purposes than for calculating the aim of a battery.

A further object is to provide a device of this kind which is extremely simple, very light, may have relatively fine adjustments, and, therefore, be very accurate, and which will permit of quick and ready use by the observation officer on the battlefield.

Other objects have to do with the details of construction and arrangement of parts as will hereafter more fully appear.

My invention is illustrated in the accompanying drawings, wherein:—

Figure 1 is a top plan view of my angle measuring instrument;

Fig. 2 is a fragmentary longitudinal sectional view through the arm A, the slide, and the protractor D;

Fig. 3 is a section on the line 3—3 of Fig. 2;

Fig. 4 is a section on the line 4—4 of Fig. 2;

Fig. 5 is a fragmentary top plan view of the arm B and its extension 14;

Fig. 6 is a section on the line 6—6 of Fig. 5;

Fig. 7 is a side elevation of the construction shown in Fig. 5;

Fig. 8 is a fragmentary cross section through the pivotal axis of the arms A, B and C;

Fig. 9 is an elevation partly in section of the means for supporting the instrument;

Fig. 10 is a fragmentary top plan view of the protractor D;

Fig. 11 is an elevation of one of the sights;

Fig. 12 is an elevation of one of the sights used at the ends of the arms;

Fig. 13 is a diagrammatic view showing the manner in which the instrument is used;

Fig. 14 is a fragmentary top plan view of the micrometer protractor;

Fig. 15 is a vertical sectional view therethrough;

Fig. 16 is a front elevation of one of the sighting devices provided with means for supporting a field glass;

Fig. 17 is a side elevation of the construction shown in Fig. 16.

Referring to these drawings, it will be seen from Fig. 1 that my instrument comprises essentially three arms, designated A, B and C, a protractor D and two radius elements E and E'. The arms B and C have a pivotal connection with the arm A, and the protractor D has a sliding engagement with the arm A, means being provided for holding the three arms set in any desired angular relation and the protractor D in adjusted relation upon the arm A. In the actual use of this device, (see Fig. 13) the arm C is directed to the aiming point P, the arm A is to be directed toward the guns G, and the arm B toward the target T.

The arm A is longitudinally slotted, as at 10, this slot terminating in an enlarged opening 11. As shown in Fig. 1, the arm A is provided along one margin with graduations 12, and these graduations indicate the distance of the battery from the observer, who is located at O, (see Fig. 13) that is at the conjunction of the several arms A, B and C. The arms B and C are alike and, therefore, the description of one arm, as for instance the arm B, will apply to the arm C. This arm B, as illustrated in Fig. 6, is of thin metal and preferably is recessed on its under face, as at 13, for the reception of an extension section 14. The arm B is provided with graduations 15 and the extension member 14 with graduations 16. The graduations on the arm A run from the pivotal point of the arm toward the free end thereof and are designed to indicate from one to nine thousand yards, while those graduations on the extension 14, however, run in a reverse order to the graduations on the arm A, that is they extend from the free end toward the pivotal center of the arm A from 9050 to 17500 yards. Of course, the extension is provided with means whereby it may be held in adjusted position with relation to the arm A when the extension is used. This may be of any suitable construction. The extremity of the extension, as illustrated in Fig. 7 at 17 has a thickness equal to the thickness of the arm B and has a width equal to the extreme width of the arm B. Mounted upon the arm B for sliding movement longitudinally therealong is a slide 18 which embraces the arm B and slides therealong and it is adapted to be carried upon the extremity 17 of the extension 14 and clamped thereon when the extension 14 is to be used. This slide is provided with an index point 19 and is cut away, at 20 and 21, so that the graduations on the arm may be read. This slide is provided with a set screw 22 whereby it may be engaged with the arm or with the terminal end 17 of the extension 16. This slide is movable longitudinally along the arm and has projecting upward from it a pin 23, and rotatably mounted upon this pin 23 is a head 24, which is slotted, as at 25. This is to accommodate the radius member and its wire extension, which will be hereafter described.

The arm A, as shown in cross section in Fig. 3, is provided with a centrally disposed slot 10, as before stated, the walls of the slot being grooved on each side, as at 26. Disposed within this slot is a slide 27 having an upwardly extending pin 28 which passes through the center of the protractor D. This protractor has the usual form, but is cut away, at 29 (see Fig. 1) so that the graduations 12 on the arm A may be read. The margin of the protractor is graduated, as at 30. As illustrated, this protractor has a radius of about 2″ and the finest graduations thereon are equal to 10 mils, but it is to be understood that this protractor may be graduated in any system of angular measurement. A protractor having a 1″ radius and interchangeable with the protractor illustrated in Fig. 1 is illustrated in Fig. 16 and will be hereafter described. The protractor is held in adjusted position upon the arm A by means of a plate 31 and a set screw 32 engaging the slide 27 and clamping the protractor. Thus the protractor may be held at any desired point along the arm A. The index point on the protractor is to be so adjusted that it will point to that graduation on the arm A which indicates the distance from the observer to the battery. Engaged with and rotatable upon the pin 28 are the radii in the form of rods 33 and 34. These are small steel rods about 1/40 of an inch in diameter and extend out about 1″ beyond the protractor and are then continued to the arm slides 18 by means of small cords or horse hairs 33ª and 34ª. It is to be understood that the rods 33 and 34 and the cords or hairs 33ª and 34ª together constitute the radius elements E and E' before referred to. The rods are preferably provided each with a small index square 35 projecting beyond the edge of the margin of the protractor. The ends of the cords or hairs 33ª and 34ª extend to the respective slides 18 and pass through the notch 25, and then are carried downward through openings in the slide and connected each to a weight 36, as illustrated in Fig. 7, whereby the hairs or cords may be held taut, while at the same time permitting the longitudinal movement of the slides. It is to be understood that a spring reel might be mounted on each of the slides 18 instead of the weight for the purpose of keeping the radius cords 33ª and 34ª taut.

The arms A, B and C are held in pivotal engagement and in adjusted relation by means shown in Fig. 8. To this end, a screw-threaded pin 37 passes downward through the arms A, B and C at their junction, this pin being provided with a head set into the arm A and passing loosely through the arms B and C. Between the arms B and C is disposed a washer 38 and engaging the screw-threads of the pin 37 is an internally and externally screw-thread nut 39. The arm C loosely surrounds this nut. The nut binds against the washer 38 and thus when this clamping screw or nut 39 is turned up, it will bind against the washer and bind the arm B in adjusted relation to the arm A. For the purpose of binding the arm C in adjusted relation to the arms A and B, I provide a second nut 40, as illustrated in Fig. 8, which engages the exterior screw-threaded nut or screw 39 and bears against the under face of the arm C. Thus, the three arms A, B and C may be independently adjusted with relation to each other and then held in their adjusted positions.

It is, of course, necessary to provide sighting devices on the several arms so that the observer may direct these arms toward the aiming point, the battery and the target respectively. To this end, the pin 37 is formed with a socket 41, and adapted to be disposed in this socket is a sight 42 formed with a pin adapted to extend into the socket and having a vertical sighting slit 43, and hinged to the extremity of each of the arms B and C is a sighting device comprising a longitudinally slotted body 44 having a hair or wire 45 extending longitudinally of the slot. When in actual use, these sights are intended to be turned into a vertical position. When not in use, however, they are turned into a horizontal position so as to permit the folding of the instrument into compact relation. In order that the pivotal center 28 of the protractor may be superimposed over the exact point of intersection of the lines of the axes of A, B and C, I preferably form the slide 27 with an extension 27ª resting upon the top of the arm A and from which extension 27ª the center pin 28 of the protractor extends. This permits the center pin 37 to be relatively strong and permits the reduction in sizes of the device. The instrument is designed to be mounted upon a suitable stand comprising a supporting plate 46 having hinged legs 47 and having a screw 48 engaging with an interiorly screw-threaded hub 49 extending downward from and forming part of the protractor slide 27, as illustrated most clearly in Fig. 9.

In Figs. 14 and 15, I illustrate another form of protractor whereby a protractor of a 1″ radius is provided which is interchangeable with the protractor D illustrated in Fig. 1. This protractor D' has a micrometer device which may be used when the protractor D cannot have sufficiently fine graduations on its margin. The protractor D' is based on the mil system. Under this system a circle is divided into 6400 equal parts. The 2″ radius protractor D may have its circumference divided into 10 mil graduations. By the use of the protractor D', the circle may be graduated into 100 mil units. This construction comprises the protractor plate 50 having graduations on its margin and passing through the center of the protractor plate is a post 51 and on this post 51 is mounted a pointer 52 having an upwardly extending pin 53. A spring 54, disposed between the pointer or indicator 52 and the protractor, urges the pointer upward. Loosely mounted on the post 51 is a gear wheel 55 with which the pin 53 is adapted to engage, this wheel being provided with a series of holes for the reception of this pin. The post 51, of course, coincides with the pivotal center of the protractor. The upper end of the post 51 is formed with a laterally extending arm 56, through which passes a vertical shaft 57. This shaft carries upon it a combined pinion and gear wheel, the pinion being designated 58 and the gear wheel 59. This pinion is ¼ the size of the gear wheel 55 and the gear wheel 59 engages with the pinion 60 of a gear wheel 61 mounted upon the shaft 51. This gear wheel 61 engages a pinion 62 carried by a graduated wheel 63 which rotates on the shaft 57. Carried on the shaft 57 is a pointer 64 or rather a slotted plate which extends down over the periphery of wheel 63 and is engaged with the supporting pin 51. With this construction, when the radius rods 33 and 34 have been given proper direction, the exact measurement is read on the protractor to its next smaller hundred. The indicating pointer 52 is then disengaged from the wheel 55 and turned about until it is in the nearest possible position to the radius E' to be measured, and then the large wheel 63 is rotated until the index of the indicator coincides with the indicator of the radius, when the graduated wheel 63 will read the angle to a single mil through the slot of arm 64.

In Figs. 16 and 17 I illustrate a mounting for a field glass to be used in connection with the sighting device 42. In this case the member 42 has a base portion 66, and is provided at its upper end with spaced forks 67 in which the medial supporting bar of the field glass may be disposed so that this bar is directly over the observation slot in member 42. One barrel of this field glass is provided with crossed hairs so that it may be sighted accurately on the objective. The barrels rest, as shown, upon the upwardly and inwardly extending braces or supporting members 65 which are slightly inclined to conform to the taper of the barrels. The braces are inclined to take care of the interpupilary adjustment of the glasses.

I will describe the use of the device shwon in Figs. 1 to 13 without the micrometer device, as the use of the micrometer device is obvious. The observer is disposed at the observation post O, (see Fig. 13). The observer knows the distance from himself to the guns or battery G and he first sights the arm A toward the battery and adjusts this arm in this fixed position. He then sights the arm B toward the target and sights the arm C toward an aiming point, that is some fixed point which can be observed from the battery, though the battery may not see the target. He then adjusts the slide 27 along the arm A so that the index point is exactly opposite that graduation on the arm A indicating the distance between the observer and the battery and fixes the slide 27 at this point. He then adjusts the slide 18 along the arm B in accordance with the range of the target from the observer and adjusts the slide 18 along the arm C in accordance with the distance to aiming point. If the range is greater than is marked on the main portions of the arms B and C, the slides are disposed upon the terminal ends of the extension members 14, and these extension members are shifted outward until the proper range has been indicated, and then the set srcews are tightened to hold these extension members in their adjusted positions.

As the radius rods and wires 33 and 33ª and 34 and 34ª are pivotally mounted at the point of engagement with the center of the protractor D and pass loosely through the supporting posts 24 and are kept taut by the weights 36 or equivalent springs, it is obvious that the angle of the radius elements E and E' with reference to each other and the center of the protractor will change as the slides 27 are shifted inward or outward on the arms B and C. After all the adjustments have been made, then the angle made by the radius elements E and E' is read from the protractor and that angle is communicated by the commanding officer at the point O to the executive officer of the battery, who causes this angle to be set off on the sights of the guns and the crossed hairs of the sights to be brought on the aiming point by traversing the guns. Then the adjustments have been properly made, the target will fall within the plane of the axis of the bore prolonged. The guns are then ready for firing, the guns being, of course, elevated to suit the range between the guns and the target and the firing of the battery being controlled in the usual manner thereafter.

It is to be understood, of course, that this device also gives what is known "as the angle of observer displacement," that is the angle GTO by the use of a separate protractor, and will give the distance from the guns to the target by the radius E. The major part of this radius, however, being a cord or hair, would be difficult or impossible of graduation so that this measurement may be made by means of a steel tape or ruler graduated to tenths of an inch. Any other means might be used, however.

It will be seen that with this construction it is possible very quickly and with a minimum chance of error to give the proper direction of fire to a battery which cannot see the target and cannot see the observer even and thus without any calculation on the part of the observer whatever. Thus it will be seen that the direction of the guns may be transmitted very quickly from the observer to the battery. The instrument is very light and simple, has no complicated parts, and requires no figuring.

While I have illustrated a construction which I believe to be thoroughly effective for the purpose intended, yet it is obvious that minor changes might be made therein without departing from the spirit of the invention as defined in the spirit of the appended claims, and that the principle of the invention might be embodied in other forms than those illustrated and that the device is not necessarily used for directing artillery fire. It might be used for many different purposes in engineering work.

I claim:—

1. An angle measuring and indicating device of the character described comprising three arms pivoted to each other at one of their extremities for independent and relative movement, a protractor slidingly mounted on one of said arms, slides slidably carried on the other arms, and radius elements connected to the center of the protractor and to said slides, said radius elements being mounted for circular movement around the axis of the protractor and permitting the longitudinal movement of the slides on the respective arms.

2. An angle measuring and indicating device of the character described comprising three arms pivoted to each other for movement into or out of angular relation, a protractor mounted upon one of said arms, said arm having graduations and the protractor having an index coacting with said graduations, and means for setting the protractor at any desired point along the protractor carrying arm, slides mounted upon the other arms and longitudinally shiftable therealong, said slide carrying arms being graduated and the slides having index points coacting with said graduations, and radius elements extending radially from the axis of the protractor and swinging around said axis, the extremities of said radius elements being slidingly engaged with the slides on the arms.

3. An angle measuring and indicating device of the character described comprising three arms pivoted to each other for movement into or out of angular relation, a protractor mounted upon one of said arms, said arm having graduations and the protractor having an index coacting with said graduations, and means for setting the protractor at any desired point along the protractor carrying arm, slides mounted upon the other arms and longitudinally shiftable therealong, said slide carrying arms being graduated and the slides having index points coacting with said graduations, and radius elements extending radially from the axis of the protractor and swinging around said axis, the extremities of said radius elements being slidingly engaged with the slides on the arms, said radius elements including flexible sections with which the slides have sliding engagement, and means for keeping said flexible sections taut.

4. An instrument of the character described comprising a longitudinally slotted protractor carrying arm and formed with a longitudinal series of graduations, a protractor mounted upon said arm for sliding movement, arms each pivoted at one end to one end of the protractor carrying arm and normally extending on opposite sides thereof, each of said second named arms being formed with a longitudinally extending series of graduations, slides mounted upon the last named arms and having openings, and radius elements comprising radius rods rotative around the axial center of the protractor and projecting beyond the edge thereof, and flexible sections attached to said radius rods and extending through said openings in the slides, and means for keeping said flexible sections at all times taut.

5. An instrument of the character described comprising a longitudinally slotted protractor carrying arm and formed with a longitudinal series of graduations, a protractor mounted upon said arm for sliding movement, arms each pivoted at one end to one end of the protractor carrying arm and normally extending on opposite sides thereof, each of said second named arms being formed with a longitudinally extending series of graduations, slides mounted upon the last named arms and having openings, and radius elements comprising radius rods rotative around the axial center of the protractor and projecting beyond the edge thereof, and flexible sections attached to said radius rods and extending through said openings in the slides, and means for keeping said flexible sections at all times taut, each of the second named arms being provided with an extension member slidingly engaged with the arm and graduated and adapted at its terminal end to receive the corresponding slide and be engaged therewith for coincident movement.

6. An angle measuring and indicating device of the character described comprising three arms pivoted to each other at their extremities for independent and relative movement, a protractor slidingly mounted on one of said arms, slides slidably carried on the other arms, and radius elements connected to the center of the protractor and to said slides, said radius elements being mounted for circular movement around the axis of the protractor and permitting the longitudinal movement of the slides on the respective arms, a sighting member mounted at the juncture of the several arms and adapted to be rotated to bring its sight into alinement within one of said arms, and sighting members carried at the extremities of said arms.

7. An instrument of the character described including a longitudinally graduated protractor carrying arm, a protractor having a slide fitting the slot of the arm and adjustable along the arm, the protractor having a central pin, a pair of arms pivotally connected each at one end to one end of each protractor carrying arm, means whereby the arms may be independently adjusted with relation to each other, slides mounted upon the second named arms for longitudinal movement therealong, said second named arms being graduated and the slides being adjusted with relation to said graduations, radius members swingingly connected to the pin of the protractor and having sliding engagement with the slides, a sighting device mounted at the junction of the several arms and adapted to be turned into alinement with each one of said arms, and sighting devices carried at the extremities of the several arms and coacting with the first named sighting device.

8. An instrument of the character described comprising a protractor carrying arm, a pair of arms coacting therewith, a screw having a head engaged with one end of the protractor carrying arm and passing through the other two arms, the head bearing against one of said arms, a washer surrounding the screw and disposed between the two second named arms, a nut engaging the screw and binding against the washer, and a nut engaging the first named nut and binding against the adjacent one of the second named arms whereby either one of the second named arms may be adjusted relative to the protractor carrying arm, slides mounted upon said arms and adjustable longitudinally thereon, said protractor carrying arm and the other two arms being formed with graduations with which the protractor and the slides coact, and radius elements swingingly mounted for movement concentric to the center of the protractor and having engagement with said slides.

9. An instrument of the character described including a protractor carrying arm, a protractor longitudinally movable thereon, the arm having graduations by which the protractor may be adjusted, a pair of arms pivotally connected to one end of the protractor carrying arm for independent movement toward or from the protractor carrying arm, means for holding said second named arms in their adjusted positions, slides mounted upon the second named arms for longitudinal movement thereon, said arms having graduations with which said slides coact and by which the slides are set and each of said slides carrying a rotatable post having a slot, and flexible radius elements operatively connected to rotate about a center whose axis is the axis of the protractor, the extremity of said flexible elements passing through said rotatable posts on the slides, and means engaged with the ends of said flexible elements whereby the flexible elements may be kept taut.

10. An angle measuring and indicating device of the character described comprising three arms pivoted to each other at one of their extremities for independent and relative movement, a protractor slidingly mounted on one of said arms, slides slidably carried on the other arms, and radius elements connected to the center of the protractor and to said slides, said radius elements being mounted for circular movement around the axis of the protractor and permitting the longitudinal movement of the slides on the respective arms, and means for supporting the instrument comprising a stand, and means on the stand for engaging the protractor.

11. An instrument of the character described comprising a slotted protractor carrying arm having a longitudinal series of graduations, two other arms pivoted at their adjacent ends to one end of the protractor carrying arm, each of these arms being adjustable relative to the protractor carrying arm independently and having a longitudinal series of graduations, slides movable along said second named arms and adjustable relative to said graduations and having means whereby they may be held in adjusted positions, radius elements mounted for swinging movement around the axial center of the protractor and operatively engaging said slides, micrometric means for indicating the position of the radius elements with reference to the graduations on the protractor comprising a shaft passing to the center of the protractor, a pointer loosely mounted on the shaft and having an upwardly extending pin, a train of multiplying gear wheels, the first of said wheels having a series of openings into which said pin is adapted to be engaged, the last of said train of gear wheels carrying a disk having graduations, and an index pointer coacting with said graduations.

12. An angle measuring and indicating device of the character described comprising three arms pivoted to each other at one of their extremities for independent and relative movement, a protractor slidingly mounted on one of said arms, slides mounted on the other arms, radius elements connected to the center of the protractor and to said slides and mounted for circular movement around the axis of the protractor and permitting the longitudinal movement of the slides on the respective arms, and sighting devices carried at the outer ends of the arms, and a sighting device carried at the junction of the arms and including a base, an upwardly extending, slotted stem, a member carried by the stem and having two spaced forks adapted to receive between them the supporting bar of a field glass, and inclined members extending upward from the base to the stem on opposite sides of said forks and formed to support the barrels of the field glass.

In testimony whereof I hereunto affix my signature.

WILLIAM L. HOGG.